United States Patent [19]

Laridon et al.

[11] 3,721,566

[45] March 20, 1973

[54] INCREASING THE LIGHT SENSITIVITY OF POLYMERIC COMPOSITIONS COMPRISING AZIDO GROUPS

[75] Inventors: Urbain Leopold Laridon, Wilrijk; Gerard Albert Delzenne, S-Gravenwezel; Hugo Karel Peeters, Mortsel, all of Belgium

[73] Assignee: Gevaert-AGFA N.V., Mortsel, Belgium

[22] Filed: July 6, 1970

[21] Appl. No.: 52,690

[30] Foreign Application Priority Data

Dec. 23, 1969 Great Britain....................62,709/69

[52] U.S. Cl...................96/115 R, 96/91 N, 96/35.1, 204/159.14

[51] Int. Cl.................................................G03c 1/70

[58] Field of Search..................................204/159.14

[56] References Cited

UNITED STATES PATENTS

| | | | |
|---|---|---|---|
| 2,940,853 | 6/1960 | Sagura et al. | 96/91 N |
| 3,475,176 | 10/1969 | Rauner | 96/115 |
| 3,467,630 | 9/1969 | Danhauser et al. | 96/115 X |
| 3,528,812 | 9/1970 | Danhauser et al. | 96/115 |
| 3,551,153 | 12/1970 | Cooper et al. | 96/91 N X |
| 3,282,693 | 11/1966 | Sagura et al. | 96/91 NX |
| 3,072,485 | 1/1963 | Reynolds et al. | 96/115 |
| 3,457,073 | 7/1969 | Delzenne | 96/115 |
| 3,528,813 | 9/1970 | Riester et al. | 96/115 |

FOREIGN PATENTS OR APPLICATIONS

| | | | |
|---|---|---|---|
| 886,100 | 1/1962 | Great Britain | 96/91 N |
| 570,732 | 2/1959 | Belgium | 96/91 N |
| 1,522,382 | 11/1969 | Germany | 96/115 |

*Primary Examiner*—Ronald H. Smith
*Attorney*—Brufsky, Staas, Breiner and Halsey

[57] ABSTRACT

The light-sensitivity of polymeric compositions comprising azido groups is increased by intimately mixing them with sensitizing agents taken from imidazoles, oxazoles, oxadiazoles, thiazoles, polynuclear aromatic hydrocarbons and polynuclear quinones.

The polymeric compositions may be composed of a mixture of a polymer comprising reactive groups with a compound or polymer containing at least two arylazide or sulphonyl azide groups. These aryl azide or sulphonyl azide groups may also be attached as substituents to the polymers containing reactive groups occasionally via a sensitizing group, or the polymer may be mixed with a compound wherein at least two azido groups are linked by means of a sensitizing group.

Production of photographic printing plates and etching resists.

5 Claims, No Drawings

INCREASING THE LIGHT SENSITIVITY OF POLYMERIC COMPOSITIONS COMPRISING AZIDO GROUPS

This invention relates to photo-crosslinking of light-sensitive polymeric compositions, and particularly to photo-crosslinking of polymeric compositions comprising azido groups. The invention also relates to the production of printing plates or films coated with such light-sensitive polymeric compositions, to recording and reproducing processes using such printing plates or films, and to the production of etching resists.

It is known to sensitize layers of albumin, gelatin and other colloids by the incorporation therein of ammonium dichromate. During photographic exposure of these layers the exposed areas become insoluble and the non-exposed areas can then be washed away. A difficulty is that with these layers sensitized with dichromate it is necessary to perform sensitization just prior to the exposure, because the sensitized surface does not keep very well. The problem is to find a process using a sensitive layer, that can be stored for a considerable time before the exposure and the subsequent processing.

Organic azides are known to decompose photolytically into nitrogen and nitrene radicals. The primary decomposition radicals thus formed, rapidly combine with reactive groups present in the polymeric materials thus resulting in a cross-linking of the polymer chains. If the polymeric material is image-wise exposed to light, a selective cross-linking and insolubilization in the image areas occurs, so that the unexposed polymeric material can be removed with a solvent.

Among the organic azides there are known e.g., aryl azides and sulphonyl azides. These aryl azides and sulphonyl azides can be present in the light-sensitive composition in different ways. According to a first embodiment the light-sensitive composition may be composed of a polymeric material comprising reactive groups, which polymeric material is mixed with a compound containing at least two arylazide or sulphonyl azide groups. According to a second embodiment the aryl azide or sulphonyl azide groups are attached as substituents to the polymer containing reactive groups, whereas according to a third embodiment the azide groups are attached to a separate polymer, which is mixed with the polymer containing reactive groups.

It is also known that an optimum degree of cross-linking of the polymeric material and a much faster reaction is obtained when the exposure to actinic light occurs in the presence of catalytic amounts of sensitizing agents such as Michler's ketone, certain naphthothiazolines, and pyrazolines.

It is an object of the invention to considerably increase the light-sensitivity of polymeric compositions comprising azide groups by the addition thereto of new classes of sensitizing agents.

According to the invention a method is provided for increasing the light-sensitivity of polymeric compositions comprising azido groups, said method comprising bringing sensitizing agents from the group consisting of imidazoles, oxazoles, oxadiazoles, thiazoles, polynuclear aromatic hydrocarbons and polynuclear quinones in intimate contact with said light-sensitive polymeric compositions comprising azido groups.

In the further description and claims the term "light-sensitive polymeric composition" is to be understood as comprising the actual polymer or polymers, which may carry azido and/or sensitizing groups. The same term also stands for mixtures of polymers and compounds containing azido and/or sensitizing groups. All these combinations will be explained more clearly hereinafter. Moreover, the term "light-sensitive polymeric composition" is to be understood as comprising in addition thereto all additives necessary to make possible or to facilitate the application of the polymeric compositions as a layer or film on a support.

Suitable imidazoles, oxazoles, and thiazoles for use as sensitizing agents in a method according to the invention are e.g.:

2,4,5-triphenylimidazole
4-(4-dimethylaminophenyl)-5-phenyl-imidazole
2-(1-naphthyl)-5-phenyl-oxazole
2-(4-nitrophenyl)-5-phenyl-oxazole
2-(4-methoxyphenyl)-5-phenyl-oxazole
2-styryl-5-phenyl-oxazole
2,2'-p-phenylene-bis(5-phenyloxazole)
2-(p-dimethylaminophenyl)-benzoxazole
(2-phenyl-5-biphenyl-1,3,4-oxadiazole)
1,4-di[2-(5-phenyloxazolyl)]-benzene
2-methylamino-4-methyl-thiazole
bis(4-methyl-2-thiazolyl).

Suitable polynuclear aromatic hydrocarbons and polynuclear quinones are e.g.:

2-anthryl-methylketone
1-(9-phenanthryl)-2-thiourea
2-methyl-anthracene
9-styryl-anthracene
9-anthrol
9-anthraldehyde
anthraquinone
5,6-chrysene-quinone
9,10-phenanthrene-quinone.

In consequence of the exposure to actinic light rays of the light-sensitive polymeric compositions of the invention comprising polymers, azido groups and sensitizing agents, the azido groups are decomposed photochemically, which results in a cross-linking reaction rendering the polymers insoluble. The cross-linking reaction is accelerated highly, when the polymers comprise groups that are reactive with radicals formed by the primary photochemical decomposition of the azido groups. Among said reactive groups there are e.g., those containing reactive hydrogen atoms such as aromatic and aliphatic —CH—bonds, hydroxyl groups, amino groups, lactam groups, double bonds of ethylenically unsaturated groups and aromatic groups such as those occurring in pyridine groups, phenyl groups, and styryl groups. The reactive groups may be substituted directly on the main polymer chain or on side-chains thereof. The reaction of the radicals with the reactive groups may be an addition reaction, an insertion reaction or a substitution reaction.

The light-sensitive polymeric composition of the invention may be composed in various ways. According to a first embodiment of the invention the light-sensitive polymeric composition is formed by a polymer carrying reactive groups, mixed with a bisazide and a sensitizing agent. The polymer carrying reactive groups may be a natural polymer, a chemically modified natural polymer, a synthetic polymerization product, polycondensation product, or polyaddition product. Examples of natural polymers carrying reactive groups, e.g., hydroxyl groups, include cellulose, starch and dextrin, and also include their partial esters and ethers, which in their structure comprise free hydroxyl groups capable of reacting with intermediates derived from the photochemical decomposition of azido groups. Specific examples are the hydroxyethyl and hydroxypropyl derivatives of cellulose and starch.

Synthetic polymerization products that can be cross-linked according to the process of the invention are butyl rubber, poly(vinyl alcohol), partly acetalized or esterified poly(vinyl alcohol), poly(vinyl pyridine), poly(vinyl pyrrolidone), and copolymers comprising in their polymeric structure styrene, vinyl alcohol, vinyl pyridine, or vinyl pyrrolidone. When the synthetic polymerization product is a copolymer, the comonomer or comonomers include styrene and its nuclear substituted derivatives, vinyl chloride, vinylidene chloride, vinyl esters, vinyl ethers, acrylic and methacrylic acid esters, acrylonitrile, methacrylonitrile, and butadiene. These comonomers are worked up in the synthetic polymerization product to impart to the copolymers a maximum of strength and hardness after exposure to light and cross-linking.

In the same way a certain amount of plurally unsaturated monomeric groups may be present in the copolymer e.g., those deriving from divinyl benzene, diglycol diacrylates, N,N'-alkylene-bis-acrylamides and -methacrylamides, N-alyl- and N-methallyl acrylamides, N,N-diallylacrylamide, ethylene diacrylate and triallyl cyanurate, provided the photosensitive layer remains soluble when not affected by actinic light.

Synthetic condensation polymers carrying free hydroxyl groups are e.g., polyamides carrying hydroxymethyl or hydroxyethyl substituents, and epoxy resins such as the polyether obtained by polycondensation of 2,2-bis(4-hydroxyphenyl)-propane with epichlorohydrin.

The relative proportions of polymeric material, bisazide, and sensitizing agent may be varied as desired or as conditions may require. The proportion of polymeric material to bisazide in the light-sensitive mixture usually varies between 75–99 to 1–25 percent by weight respectively. In general the sensitizing agent is present in an amount of 0.1 to 20 percent by weight, preferably 10 percent by weight with respect to the amount of bisazide present.

A large number of compounds that contain two sulphonyl azido groups and that are suited for use as light-sensitive cross-linking agents according to the invention are described in the United Kingdom Pat. specification No. 1,062,884.

According to a second embodiment of the invention the light-sensitive polymeric composition is formed by mixing a sensitizing agent with a polymer carrying reactive groups and azido substituents.

A polymer containing azido groups can be prepared by forming the azide on a simple molecule, which is then united with the polymer by means of a reactive group. Such reactions are described by G.A. Delzenne in European Polymer Journal — Supplement 1969, pp. 55–91, by G.A. Delzenne and U. Laridon in Journal of Polymer Science, Part C, No. 22 (1969) pp. 1149–1160 and in the United Kingdom Patent specification No. 1,089,095.

For the photo-cross-linking reaction it is sufficient that two azido substituents be present in each polymer molecule and, although all the recurring units may be substituted by an azido group. Optimal results, however, are obtained, when only 50 mole percent of the recurring units forming the polymer are substituted by an azido group. Here also the sensitizing agent is present in an amount of 0.1 to 20 percent, preferably 10 percent by weight with respect to the weight of azido groups present.

According to a third embodiment of the invention the light-sensitive polymeric composition is formed by a polymer wherein the sensitizing agents as well as the azido groups and the reactive groups are present as substituents on polymer chains. In this case the polymer may be formed by a simple polymer containing azido groups, preferably also reactive groups and sensitizing groups. The polymer may also be formed from a mixture of two polymers, a first polymer containing the azido groups and a second polymer containing the reactive groups, the sensitizing groups being present on either polymer. Polymeric materials of these classes are also described in the United Kingdom Patent specification No. 1,089,095.

The relative proportions of azido groups, reactive groups and sensitizing groups in the soluble polymer or polymeric mixture are fully determined by the structure of the polymer(s) and can be varied over a wide range of concentrations. In general the presence of two azido groups per molecule of polymer suffices to obtain the desired cross-linking reaction on exposure to actinic light. Even all the recurring units of the polymer may be substituted with azido groups. Also in this case optimal results are obtained, however, when the polymer is formed of about 50 mole percent of recurring units substituted by an azido group. The amount of sensitizing groups varies between 0.1 and 20 percent, and is preferably 10 percent by weight of the total weight of azido groups present.

According to a very interesting fourth embodiment of the invention the azido substituents are linked to the polymeric chain via a sensitizing group. In comparison with the preceding embodiment of the invention wherein azido groups and sensitizing groups belong to separate repeating units of the polymeric chains, a considerable increase in light-sensitivity of the polymeric composition is obtained.

According to a fifth embodiment of the invention the light-sensitive polymeric composition is formed by a polymer preferably carrying reactive groups and mixed with a compound wherein at least two azido groups are linked by means of a sensitizing group. Also in this case a considerable increase in light-sensitivity is obtained.

Just like in the case wherein a polymeric material is mixed with a bisazide and a sensitizing agent, the proportion of polymeric material to the compound containing azido groups may vary between 75–99 and 1–25 percent by weight respectively.

Examples of suitable compounds are:
2,5-di(4-azidophenyl)-oxazole,
2,4,5-tri(4-azidophenyl)-oxazole,
2-(4-azidostyryl)-5(4-azidophenyl)-oxazole.

The polymeric compositions may be exposed to actinic light originating from any radiation source and of any type. The radiation source should preferably furnish an effective amount of ultraviolet radiation. Suitable sources of light include carbon arcs, mercury vapor lamps, fluorescent lamps, argon glow lamps, photographic flood lamps, tungsten lamps, flash lamps, and lasers.

For initiating the photochemical cross-linking by means of the azido groups there is not needed a very strong radiation source. Indeed, in some of the examples described hereinafter, a 80 Watt mercury vapor lamp is used. Brighter radiation sources are in general not needed, since at these relatively low light intensities the photochemically cross-linking influence of the azido groups is found to be strong enough.

There are not required high temperatures in the photochemical insolubilization of polymers carrying azido groups. The exposure, however, to strong radiation sources placed at a relatively short distance brings about a certain heating of the mass to be cross-linked, which heating exercises a favorable influence upon the cross-linking rate.

It has been found that the polymeric composition comprising azido groups according to the invention is light-sensitive, in the sense that its exposure to light causes its insolubilization. Thus, if a layer of such an initially soluble light-sensitive polymeric composition is applied to a support and exposed photographically the exposed areas become insoluble.

The invention is valuable in forming plates and films wholly made of the light-sensitive polymeric composition. The present process also makes possible the formation of coated printing films on any base by the deposition according to known processes of films or coatings of the light-sensitive polymeric composition. Typical bases are metal sheets (e.g., of copper, aluminum, zinc, magnesium, etc.), glass, cellulose ester film, poly(vinyl acetal) film, polystyrene film, polycarbonate film, poly(ethylene terephthalate) film, paper, etc. For screen printings metal screens, e.g., of bronze and steel, as well as of polyamides such as nylon fabrics are well suited.

The base or support is coated with a solution of the light-sensitive polymeric composition in a suitable solvent, whereupon the solvent or solvent mixture is eliminated by known means such as evaporation, thus leaving a more or less thin coating of the light-sensitive polymeric composition upon the base or support. Thereafter the dried light-sensitive coating is exposed to actinic light rays.

When the support material carrying the light-sensitive polymeric composition is light-reflecting, there may be present, e.g., superposed on said support and adherent thereto or at the surface thereof, a layer or stratum absorptive of actinic light, so as to minimize reflectance of incident actinic light from the combined support.

If the light-sensitive polymeric composition is water-soluble, water may be used as solvent in the coating of the support. However, if light-sensitive polymeric compositions insoluble in water are used, organic solvents, mixtures of organic solvents, or mixtures of organic solvents and water may be used.

The plates formed wholly of or coated with the light-sensitive polymeric composition are useful in photography, photomechanical reproduction, lithography, and intaglio printing. More specific examples of such uses are offset printing, silk screen printing, duplicating pads, manifold stencil sheeting coatings, lithographic plates, relief plates, and gravure plates. The term "-printing plates" as used herein is inclusive of all of these.

A specific application of the invention is illustrated by a typical preparation of a printing plate. In this application, a plate usually of metal, is coated with a film of the light-sensitive composition. When the plate is not of metal it may consist wholly of the light-sensitive composition or it may be coated with a layer thereof. In all these cases the surface of the plate is then exposed to light through a contacted process transparency, e.g., a process positive or negative (consisting solely of opaque and transparent areas and wherein the opaque areas are of the same optical density, the so-called line or half-tone negative or positive). The light-induces the cross-linking reaction, which insolubilizes the areas of the surface beneath the transparent portions of the image, whereas the areas beneath the opaque portions of the image remain soluble. The soluble areas of the surface are then removed by washing away with a solvent or a solvent mixture for the unaltered polymeric composition. The remaining insoluble relief portions of the film can serve as a resist image. The exposed base material is etched, thus forming a relief plate. This plate can be inked and used as a relief printing plate directly in the usual manner.

After washing away of the non-exposed and thus soluble parts of the layer or film, the polymer parts made insoluble by exposure to actinic light may be subjected, if desired, to other known hardening techniques.

The following examples illustrate the present invention.

EXAMPLE 1

7.1 g of polyether of 2,2-bis(4-hydroxyphenyl)-propane and epichlorohydrin together with 21.6 g of p-azidobenzenesulphonyl chloride were dissolved in a mixture of 40 ml of methylene chloride and 40 ml of pyridine. The resulting solution was allowed to stand for 60 hours at room temperature in the dark, whereupon it was diluted with 200 ml of methylene chloride, filtered, and poured out in 2 liter of methanol whilst stirring.

The precipitated polymer was collected, dried in vacuo, dissolved again in 100 ml of methylene chloride, filtered, poured out again in 1 l of methanol, and finally dried in vacuo at room temperature.

Yield: 9 g of polymer consisting of recurring units that are randomly distributed along the polymer chain and correspond to the following Formulas:

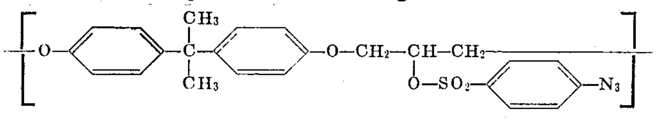

and

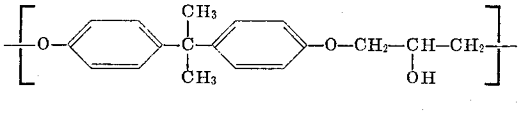

It appeared from the analysis that the polymer contains more than 90 mole percent of recurring units according to the first formula.

Fifty mg of the above polymer was dissolved in 2 ml of a 80:20 by volume mixture of butanone and cyclohexanone, whereupon 5 mg of sensitizing agent was added. The resulting solution was coated on an aluminum foil and dried.

The layer formed was exposed through a line negative by means of an 80 Watt high pressure mercury vapor lamp, placed at a distance of 10 cm.

Subsequently, the layer was developed in butanone, the non-exposed portions being washed away. Thus, a positive image was formed from the line negative. In order to make the resulting image more visible, it could be colored with crystal violet dissolved in toluene.

The relief image formed could be used as an etching resist.

Depending on the nature of the sensitizing agent used, the following results were obtained.

| Sensitizing agent | Minimum exposure time required for image formation |
|---|---|
| 2,4,5-triphenylimidazole | 12 sec |
| 4-(4-dimethylaminophenyl)-5-phenylimidazole | 12 sec |
| 2-(4-nitrophenyl)-5-phenyl-oxazole | 3 sec |
| 2-(1-naphthyl)-5-phenyl-oxazole | 2 sec |
| 2-styryl-5-phenyl-oxazole | 1.5 sec |
| 1,4-di[2-(5-phenyl-oxazole)]-benzene | 12 sec |
| 2-(p-dimethylamino-phenyl)-benzoxazole | 1.5 sec |
| bis-(4-methyl-2-thiazolyl) | 1.5 sec |

EXAMPLE 2

The process of example 1 was repeated but the polyether was allowed to react with only 4 g of p-azidobenzenesulphonyl chloride. A substituted polyether having the same recurring units as the polyether of example 1 was obtained. It comprised approximatively 50 mole percent of both units.

Seven g of the thus formed polyether together with 2.5 g of 2-(4-chlorocarbonylphenyl)-5-phenyl-oxazole were dissolved in 70 ml of methylene chloride and 10 ml of pyridine. The solution was allowed to stand for 60 hours in the dark at room temperature.

The solution was then diluted with 100 ml of methylene chloride, filtered, and poured out in 2 l of methanol whilst stirring. The polymer was collected, dried in vacuo, dissolved again in 100 ml of methylene chloride, filtered, precipitated in 1 l of methanol, and finally dried in vacuo.

Yield: 6.5 g of a polymer composed of recurring units that are randomly distributed along the polymer chain and correspond to the following Formulas:

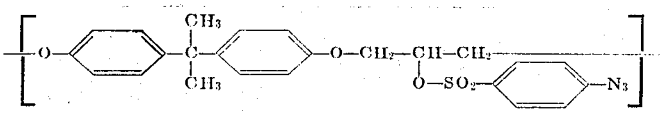

and

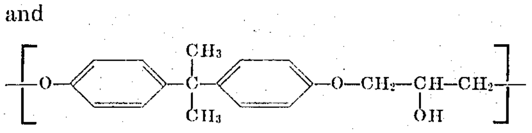

and

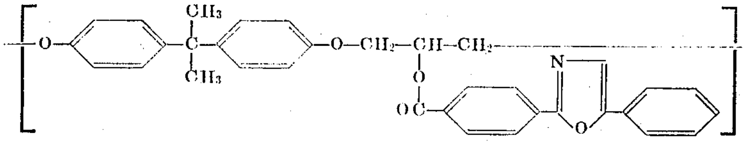

The proportion of the different units in the polymer was 50, 48, and 2 mole percent respectively.

0.2 g of the resulting polymer was dissolved in 8 ml of methylene chloride. The solution was coated on an aluminum foil in such a way that upon drying a layer having a thickness of 1 $\mu$ was obtained.

The layer was then exposed through a line negative to an 80 watt high pressure mercury vapor lamp at a distance of 15 cm. The exposed layer was developed in methylene chloride, so that the unexposed portions were washed away. A minimum exposure of 30 seconds was sufficient to obtain a sharp relief image.

EXAMPLE 3

7.1 g of polyether of 2,2-bis(4-hydroxyphenyl)-propane and epichlorohydrin together with 10.8 g of p-azidobenzene sulphonyl chloride were dissolved in 40 ml of methylene chloride and 20 ml of pyridine. The resulting solution was allowed to stand for 60 hours at room temperature in the dark. Subsequently, it was diluted with 200 ml of methylene chloride, filtered, and poured out in 2 l of methanol whilst stirring. The precipitated polymer was collected, dried in vacuo, dissolved again in 100 ml of methylene chloride, filtered, poured out in 1 l of methanol, and finally dried in vacuo at room temperature.

Yield : nine g of a polymer with the same recurring units as those of the polymer used in example 1, but wherein almost all of the recurring units correspond to the first formula.

Eighty mg of this polymer and 8 mg of sensitizing agent were dissolved in a mixture of 1 ml of methylene chloride and 1 ml of tetrachloroethane. The solution was coated on an aluminum foil in such a way that upon drying layers having a thickness of approximately 1 $\mu$ were obtained.

The layer was then exposed through a line negative at a distance of 50 cm from a carbon arc of 40 amp/42 V. Subsequently, the exposed layers were developed in butanone. The non-exposed portions were washed away thereby, so that a positive relief image was formed from the line negative. This relief image could be colored with a solution of crystal violet in a 40:60 by volume mixture of ethylene glycol monomethyl ether and tetrachloroethane.

The relief image formed could be used as an etching resist.

Depending on the nature of the sensitizing agent used the following results were obtained.

| Sensitizing agent | Minimum exposure time required for the formation of an image |
|---|---|
| anthracene | 6 sec |
| 9-styryl-anthracene | 6 sec |
| 2-anthrylmethyl ketone | 4.5 sec |
| 2-methyl-anthracene | 4.5 sec |
| 9-anthrol | 1.5 sec |
| 9-anthraldehyde | 4.75 sec |
| 1-(9-phenanthryl)-2-thiourea | 18 sec |
| anthraquinone | 4.5 sec |
| 9,10-phenanthrene quinone | 3 sec |
| 5,6-chrysene quinone | 9 sec |

EXAMPLE 4

7.5 g of polyether according to example 2, wherein approximately 50 mole percent of the recurring units are substituted with a p-azidobenzene sulphonyl group, together with 3 g of 1-chlorosul-phonyl anthracene were dissolved in 70 ml of methylene chloride and 10 ml of pyridine. The resulting solution was allowed to stand for 24 hours at room temperature in the dark. Subsequently, the solution was diluted with 100 ml of methylene chloride, filtered, and poured out in 2 l of methanol whilst stirring. The precipitated polymer was then dissolved again in 100 ml of methanol, filtered, poured out in 2 l of methanol whilst stirring, and drying in vacuo at room temperature.

Yield : 6.5 g of a polymer composed of randomly substituted recurring units of the following formulas :

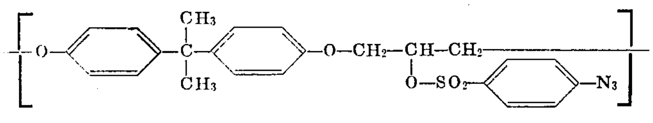

and

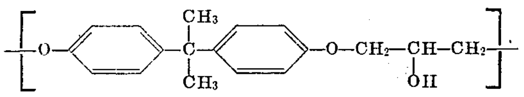

and

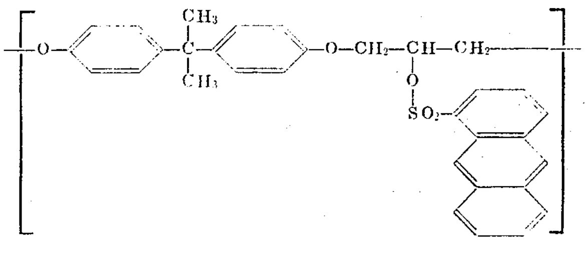

wherein the proportion of the different units is 50, 46.5, and 3.5 mole percent respectively.

0.2 g of this polyether was dissolved in 8 ml of methylene chloride. The solution was coated on an aluminum foil. The dried layer was 1 $\mu$ thick. This layer was exposed through a line negative with an 80 watt high pressure mercury vapor lamp placed at a distance of 15 cm. The layer was then developed with methylene chloride to remove the non-exposed portions by washing away. A minimum exposure time of 10 seconds was required to obtain a fine relief image.

EXAMPLE 5

In a flask provided with a stirrer and a reflux condenser 25 g of a copolymer of ethylene, vinyl chloride, and vinyl sulphochloride (45.2:48.6:6.2 percent by weight) was dissolved in 100 ml of butanone whilst stirring and heating up to 65°C on a waterbath. Subsequently, a solution of 1.6 g of sodium azide in 5 ml of water was added and the mixture was stirred for 2 hours at 50°C.

The reaction mixture was washed with 300 ml of water and then poured out in 1 l of methanol. The polymer was collected and dried in vacuo.

Yield : 24 g of a polymer composed of randomly distributed recurring units of the following formulas :

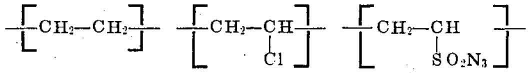

One ml of a 10 percent by weight solution of this polymer in xylene was diluted with 3 ml of xylene, whereupon 10 mg of sensitizing agent were added. The solution was then coated on an aluminum foil so that upon drying a layer having a thickness of approximately 1 $\mu$ was obtained.

The resulting layer was exposed through a line negative with an 80 Watt high pressure mercury vapor lamp at a distance of 15 cm. The non-exposed portions of the layer were washed away with xylene.

Depending on the nature of the sensitizing agent used the following results were obtained.

| Sensitizing agent | Minimum exposure time required for the formation of an image |
|---|---|
| 2-(1-naphthyl)-5-phenyl-oxazole | 7.5 sec |
| 2-(p-dimethylaminophenyl)-benzoxazole | 7.5 sec |
| 4-(4-dimethylaminophenyl)-5-phenylimidazole | 25 sec |
| 2-styryl-5-phenyl-oxazole | 15 sec |

EXAMPLE 6

In this example the sensitizing influence of internally sensitized di- and triazides was examined.

A. Preparation of 2,5-di(4-azidophenyl)-oxazole

In a flask fitted with a stirrer and a thermometer 2.317 g of 2.5-di(4-aminophenyl)-oxazole were brought in 50 ml of water and 4 ml of concentrated hydrochloric acid.

Whilst cooling of the mixture to 0°C and stirring, a solution of 1.3 g of sodium nitrite in 5 ml of water was added thereto. The mixture was stirred for 10 minutes, whereupon 1.5 g of sodium azide in 5 ml of water was added. The reaction mixture was then stirred for another 10 minutes. The precipitate was sucked off, washed with water, and dried in vacuo.

Yield : 2.61 g melting at 130°C. The product formed corresponded to the following structural formula:

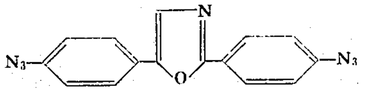

B. Preparation of 2(4-azidostyryl)-5(4-azidophenyl)-oxazole

In a flask fitted with a stirrer and a thermometer 2.77 g of 2(4-aminostyryl)-5(4-aminophenyl)-oxazole was brought in 50 ml of water and 4 ml of concentrated hydrochloric acid. The mixture was cooled to 0°C and stirred, whereupon a solution of 1.4 g of sodium nitrite in 5 ml of water was added. Stirring was continued for 15 minutes at 0°–5°C. Subsequently, 1.5 g of sodium azide in 5 ml of water was added, whereupon there was stirred for another 15 minutes. The precipitate formed was recrystallized from acetone.

Yield : 1.71 g melting at 172°C. The product formed corresponded to the following structural formula :

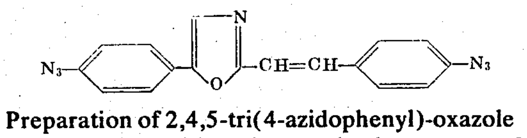

C. Preparation of 2,4,5-tri(4-azidophenyl)-oxazole

In a flask fitted with a stirrer and a thermometer 0.5 g of 2,4,5-tri(4-aminophenyl)-oxazole was added to 10 ml of water and 0.9 ml of concentrated hydrochloric acid. The mixture was cooled to 0°C and stirred while a solution of 0.31 g of sodium nitrite in 2 ml water was added.

Subsequently, the stirring was continued for another 15 minutes at 0°–5°C, whereupon a solution of 0.35 g of sodium azide in 2 ml of water was added. After stirring for another two hours at room temperature, the precipitate was sucked off, washed with water and dried in vacuo.

Yield : 0.575 g of a product corresponding to the following formula and melting at 165°–172°C :

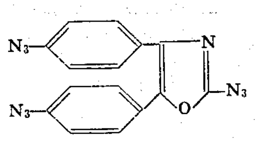

The three internally sensitized polyazides were tested as to their photohardening influence on cyclized rubber. Their photo-activity was compared with that of 2,6-bis(p-azido-benzylidene)-4-methyl-cyclohexanone according to the structural formula :

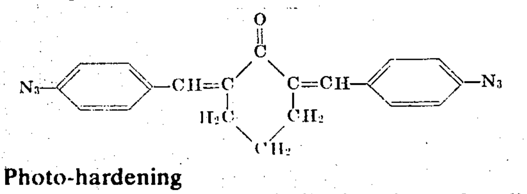

D. Photo-hardening

One ml of a 20 percent solution in xylene of cyclized rubber was mixed with 4 ml of methylene chloride, 3 ml of xylene, and 10 mg of internally sensitized azide. The resulting solution was coated on an aluminum foil so that upon drying a layer having a thickness of 1 μ remained. The layer was exposed through a line negative with a high pressure 80 Watt mercury vapor lamp at a distance of 10 cm. The exposed layer was then developed in xylene. The free aluminum portions were hydrophilized by rubbing with a 1 percent aqueous solution of phosphoric acid. The resulting positive relief image was then colored by rubbing it with a red offset ink.

The results of the tests are represented in the following table.

| Sensitizing agent | Minimum exposure time required for the formation of an image |
|---|---|
| 2,6-bis-(p-azidobenzylidene)-4-methylcyclohexanone | 4 sec |
| 2,5-di(4-azidophenyl)-oxazole | 4 sec |
| 2(4-azidostyryl)-5(4-azidophenyl)-oxazole | 4 sec |
| 2,4,5-tri(4-azidophenyl)-oxazole | 4 sec |

EXAMPLE 7

When replacing the internally sensitized di- and triazides in Example 6, by a non-internally sensitized diazide alone or mixed with a sensitizing agent, the following results were obtained.

| Diazide | Sensitizing agent | Minimum exposure time required for the formation of an image |
|---|---|---|
| 2,2-bis[4(p-azidobenzoyloxy)-phenyl]-propane | | 30 min |
| idem | 4 mg of 2,5-diphenyl-oxazole | 10 min |

From the comparison of the tests of Examples 6 and 7 it appears clearly that there is obtained a considerable increase in light-sensitivity, when at least two azido groups are linked by means of a sensitizing group, i.e., when an internally sensitized polyazide is present.

EXAMPLE 8

1.4 g of polyether of 2,2-bis(4-hydroxyphenyl)-propane and epichlorohydrin were dissolved in 15 ml of methylene chloride and 3 ml of pyridine.

0.6 g of 2(4-chlorocarbonylphenyl)-5-(4-azidophenyl)-oxazole were added within 10 minutes whilst stirring. This mixture was allowed to stand for 48 hours at room temperature in the dark, whereupon it was diluted with 10 ml of methylene chloride, filtered, and poured out in 100 ml of methanol. The precipitated polymer was collected and dried in vacuo at room temperature.

There was obtained 0.5 g of an internally sensitized polymer composed of randomly distributed recurring units according to the following structural formulas :

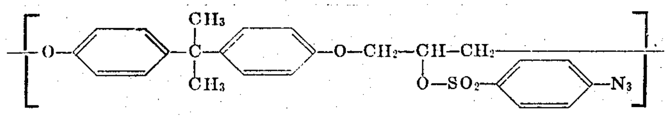

and

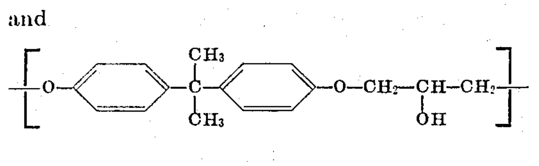

The polymer comprises 30 recurring units according to the second formula for every recurring unit according to the first formula.

0.1 g of the internally sensitized polyether was dissolved in 4 ml of methylene chloride. The resulting solution was coated on an aluminum foil so that upon drying a layer having a thickness of 1 $\mu$ was obtained. The sensitive layer was exposed through a line negative with an 80 Watt high pressure mercury vapor lamp at a distance of 15 cm. The non-exposed portions were washed away with methylene chloride.

In order to obtain a sharp positive relief image, a minimum exposure time of 1 sec was needed.

When calculating in the polymer of this example the weight proportion between the azido groups and the sensitizing groups present we find a value of approximatively 0.2. Such a proportion corresponds with an exposure time of at least 1 second.

If there would be taken a polymer having almost as low a number of azido groups on the chain and an excess of sensitizing groups so that the weight proportion would become 0.004, an exposure time of 4 min would be necessary.

We claim:

1. A light-sensitive polymer composition comprising a polymer having a polymeric chain containing thereon or appended therefrom a plurality of azido groups, a plurality of groups reactive with radicals resulting from the photolytic decomposition of azido groups, and a lightsensitive nucleus selected from the group consisting of imidazoles, oxazoles, oxidiazoles, thiazoles, anthracenes, and polynuclear quinones.

2. The light-sensitive polymeric composition of claim 1 wherein the polymer is a polyether of 2,2-bis(4-hydroxyphenyl)-propane and epichlorohydrin.

3. The polymeric composition of claim 2 wherein the sensitizing nucleus is the moiety of 2,4,5-triphenyl imidazole, 2-styryl-5-phenyloxazole, 2-(p-dimethylaminophenyl)-benzoxazole, and bis(4-methyl-2-thiazolyl).

4. The polymeric composition of claim 2 wherein the sensitizing nucleus is the moiety of anthracene, 9-anthrol, and 9,10-phenanthrene quinone.

5. The light-sensitive polymeric composition of claim 1 wherein the azido groups are bound to the polymeric chain through the light-sensitive nucleus.

* * * * *